United States Patent [19]

Esashika

[11] 4,275,417

[45] Jun. 23, 1981

[54] APERTURE CORRECTION SIGNAL PROCESSING CIRCUIT

[75] Inventor: Tadashi Esashika, Atsugi, Japan

[73] Assignee: Sony Corporation, Tokyo, Japan

[21] Appl. No.: 120,534

[22] Filed: Feb. 11, 1980

[30] Foreign Application Priority Data

Feb. 15, 1979 [JP] Japan .................................. 54/16550

[51] Int. Cl.$^3$ ............................................... H04N 5/14
[52] U.S. Cl. .................................................... 358/162
[58] Field of Search ........................................ 358/162

[56] References Cited

U.S. PATENT DOCUMENTS 3,708,753   1/1973   Radecke ......................... 358/162 X Primary Examiner—Robert L. Richardson
Attorney, Agent, or Firm—Hill, Van Santen, Steadman, Chiara & Simpson

[57] ABSTRACT

An aperture correction signal processing circuit includes first and second differential amplifiers, each consisting of first and second transistors. The respective first transistors of the first and second differential amplifiers are applied at respective base electrodes thereof with first and second aperture correction signals, which are opposite in phase to each other, while the base electrodes of the respective second transistors of the first and second differential amplifiers are connected to each other and fed with a variable bias voltage. The common electrodes of the first and second transistors of the first differential amplifier are connected to each other and further to a variable constant-current source, while the common electrodes of the first and second transistors of the second differential amplifier are connected to each other and further to a variable constant-current source, both of the above sources being simultaneously controllable. Thus, output signals from the first and second differential amplifiers are fed to the base electrode of a transistor for being added together to obtain an aperture correction signal free from noise at its emitter electrode.

8 Claims, 14 Drawing Figures

APERTURE CORRECTION SIGNAL PROCESSING CIRCUIT

BACKGROUND OF THE INVENTION

1. Field of the Invention

This invention relates generally to an aperture correction signal processing circuit for processing an aperture correction signal used for improving the distinction of a reproduced picture of, for example, a colour television receiver, and more particularly to an improved aperture correction signal processing circuit by which an aperture correction signal free from noise can be obtained with simple construction.

2. Description of the Prior Art

In a television receiver, particularly in a color televsision receiver, aperture correction has been carried out in order to display a reproduced picture with distinct contour on the screen of the picture tube. To this end, an aperture correction circuit is provided on the video signal transmission path to produce an aperture correction signal. This aperture correction signal is added to the video signal to obtain an aperture-corrected video signal which is fed to the picture tube to display a clear picture on its screen. FIG. 1 shows the aperture correction circuit as mentioned above.

In the circuit of FIG. 1, reference numeral 1 designates an input terminal 1 to which the video signal is supplied. The input terminal is connected to the input side of a delay circuit 2 the output side of which is in turn connected to the input side of another delay circuit 3. The delay circuits 2 and 3 are designed to have the same characteristics or to have the same delay time $\tau$. The output side of the delay circuit 3 is connected to one input side of an adding circuit 4, while the input terminal 1 is connected directly to the other input side of the adding circuit 4. The output side of the adding circuit 4 is then connected to one input side of a subtracting circuit 5, while the output side of the delay circuit 2 is connected to the other input side of the subtracting circuit 5. Further, the output side of the subtracting circuit 5 is connected to one input side of an adding circuit 6, while the output side of the delay circuit 2 is connected to the other input side of the adding circuit 6. Then, the output side of the adding circuit 6 is connected to an output terminal 7.

The video signal fed to the input terminal 1 is practically of a dull rectangular waveform due to characteristics of the transmission path and the like. In this case, however, the video signal is assumed to be a pure rectangular wave signal 8 as shown in FIG. 2A for the sake of easy explanation. This video signal 8 is supplied to the delay circuit 2 to derive therefrom a video signal 9 which is delayed by time $\tau$ as shown in FIG. 2B. The signal 9 is then applied to the delay circuit 3 where it is further delayed by another time $\tau$ to provide a signal 10, which is delayed from the video signal 8 by $2\tau$ in total, as shown in FIG. 2C. Thus, the adding circuit 4 is fed with the signal 10 from the delay circuit 3 and the video signal 8 from the input terminal 1 thereby producing a signal 11 as shown in FIG. 2D. This signal 11 is next applied to the subtracting circuit 5 for being subtracted from the output signal 9 of the delay circuit 2 so that an aperture correction signal 12 as shown in FIG. 2E is obtained at the output side of the subtracting circuit 5. This aperture correction signal 12 is applied to the adding circuit 6 where it is added to the video signal 9 fed from the delay circuit 2 to provide at the output terminal 7 an aperture-corrected video signal 13 with its largely changing portions being preshot and overshot as shown in FIG. 2F. When this video signal 13 is applied to the picture tube in the color television receiver, a picture with distinct contour must be reproduced.

However, the aperture correction signal produced in the circuit of FIG. 1 is normally superposed with base noise as shown in FIG. 3 due to noise caused by band pass characteristics of the circuit, noise originally contained in the input signal, and so on. For this reason, the video signal corrected by the aperture correction signal 12 will be superposed thereon with noise. As a result, when this video signal is applied to the picture tube, the reproduced picture on the screen is adversely influenced by the noise and hence a proper aperture correction will not be achieved.

SUMMARY OF THE INVENTION

Accordingly, it is an object of this invention to provide an improved aperture correction signal processing circuit in which a good aperture correction signal free from base noise can be produced with a simplified circuit arrangement.

It is another object of this invention to provide an aperture correction signal processing circuit for producing an aperture correction signal used for improving the distinction of a reproduced picture of a color television receiver.

It is a further object of this invention to provide an aperture correction signal processing circuit in which base noise clipping level can be simply controlled to a desired level by a variable DC voltage source to obtain an aperture correction signal free from noise.

It is an additional object of this invention to provide an aperture correction signal processing circuit in which aperture correction amount or its peak value can be easily controlled.

It is a still further object of this invention to provide an aperture correction signal processing circuit which is suitable for the formation of an integrated circuit.

According to one aspect of the invention, there is provided an aperture correction signal processing circuit including first and second differential amplifiers, each consisting of first and second transistors, means for providing first and second aperture correction signals which are opposite in phase to each other, means for supplying the first and second aperture correction signals respectively to the base electrodes of respective first transistors of the first and second differential amplifiers, means for electrically connecting the base electrodes of respective second transistors of the first and second differential amplifiers, means for supplying a bias voltage to the base electrodes of the second transistors of the first and second differential amplifiers, means for changing the bias voltage, first output means coupled to the collector electrode of the first transistor of the first differential amplifier, second output means coupled to the collector electrode of the second transistor of the second differential amplifier, and means for adding output signals from the first and second output means.

The other objects, features and advantages of the invention will be apparent from the following description taken in conjunction with the accompanying drawings.

DESCRIPTION OF THE PREFERRED EMBODIMENT

Figure 1:
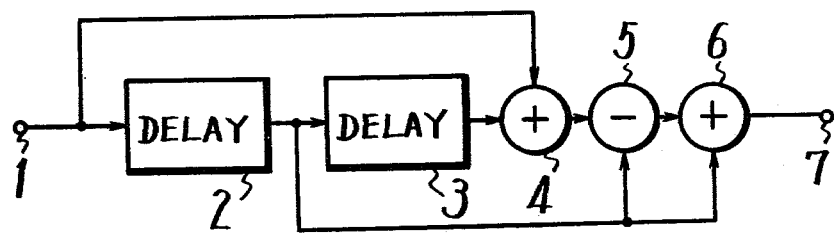
FIG. 1 is a systematic view showing a prior art aperture correction circuit.

A description will hereinafter be given on one embodiment of an aperture correction signal processing circuit of this invention with reference to FIG. 4, in which elements corresponding to those of FIG. 1 are shown by the same reference numerals.

Figure 4:
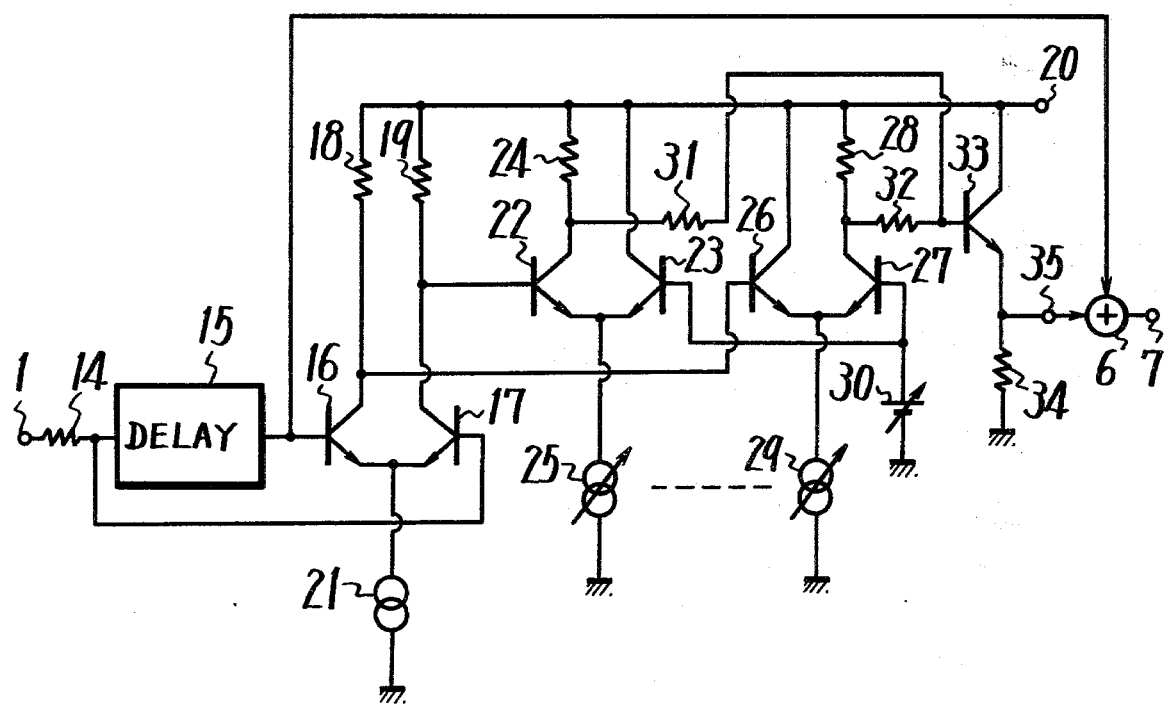
FIG. 4 is a connection diagram showing one embodiment of an aperture correction signal processing circuit according to the invention.

In the circuit of FIG. 4, an input terminal 1 is connected through a resistor 14 to a delay circuit 15 at its input side, while the output side thereof is connected to the base electrode of one of NPN-type transistors 16 and 17, or of the transistor 16 in this example, at a mismatching condition. The transistors 16 and 17 form a differential amplifier. The collector electrodes of the transistors 16 and 17 are connected respectively through resistors 18 and 19 to a power supply terminal 20, while the emitter electrodes thereof are connected to each other with the connection point thereof being grounded through a constant current circuit 21. Further, the connection point between the resistor 14 and the delay circuit 15 is connected to the base electrode of the transistor 17 at a matching condition. That is, in this case, the transistor 16 is applied at its base electrode with a signal which has passed the delay circuit 15 once. However, since the base electrode of the transistor 16 is connected in a mismatching manner with the delay circuit 15, the signal applied to the base electrode of the transistor 16 is partially reflected therefrom and again passed back through the delay circuit 15. Thus obtained signal, which has passed the delay circuit 15 twice, is applied to the base electrode of the transistor 17 together with the video signal 8 from the input terminal 1. In this example, the signal reflection caused by mismatching connection is utilized so that the dealy circuit 15 may serve as two circuits. As a result, it is substantially the same as the system consisting of two delay circuits 2 and 3 as shown in FIG. 1.

Next, the collector electrode of the transistor 17 is connected to the base electrode of an NPN-type transistor 22 which forms a first differential amplifier together with an NPN-type transistor 23, while the collector electrode of the transistor 16 is connected to the base electrode of an NPN-type transistor 26 which forms a second differential amplifier together with an NPN-type transistor 27. The base electrodes of the transistors 23 and 27 are connected to each other and further grounded through a variable voltage source 30. The emitter electrodes of the transistors 22 and 23 forming the first differential amplifier are connected to each other and the connection point therebetween is grounded through a variable constant-current circuit 25, while the emitter electrodes of the transistors 26 and 27 forming the second differential amplifier are connected to each other and the connection point therebetween is grounded through a variable constant-current circuit 29. In this case, if the voltage value of the variable voltage source 30 is adjustable, the base noise clipping level can be simply adjusted to a desired level. Further, if respective current values of the variable constant-current circuits 25 and 29 are made adjustable in an interlocking manner, the aperture correcting amount or the peak value of the correcting amount can be controlled.

The collector electrodes of the transistors 22 and 27 are connected respectively through resistors 24 and 28 to the power supply terminal 20, while the collector electrodes of the transistors 23 and 26 are connected directly to the power supply terminal 20. The collector electrodes of the transistors 22 and 27 are further connected through resistors 31 and 32, respectively, to the base electrode of an NPN-type transistor 33 which serves as an adding circuit. The emitter electrode of the transistor 33 is grounded through a resistor 34 and the collector electrode thereof is connected to the power supply terminal 20. The emitter electrode of the transistor 33 is also connected to an output terminal 35 of the aperture correction signal.

Figure 2A:
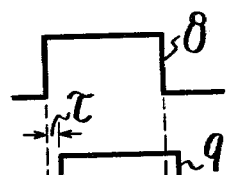
FIGS. 2A to 2F, inclusive, represent waveforms of signals appearing at respective parts of the circuit of FIG. 1.
Figure 2B:
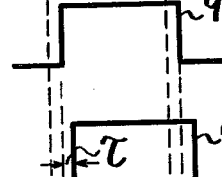
Figure 2C:
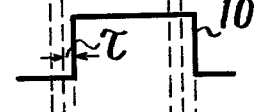
Figure 2D:
Figure 2E:
Figure 2F:
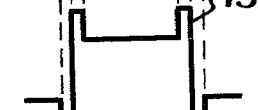
Figure 3:
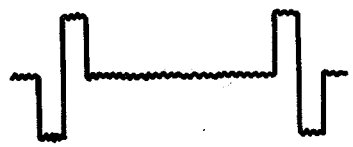
FIG. 3 shows a waveform of an aperture correction signal produced in the circuit of FIG. 1.
Figure 5A:
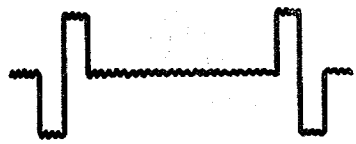
FIGS. 5A through 5E show waveforms of signals obtained at respective parts of the circuit shown in FIG. 4.
Figure 5B:

With the circuit arrangement as mentioned above, a video signal 8 as shown in FIG. 2A is applied through the input terminal 1 and the resistor 14 to the delay circuit 15 where it is delayed by time $\tau$, for example, 0.25 micro second ($\mu$s) to provide a delay signal 9 as shown in FIG. 2B, which is fed to the base electrode of the transistor 16. In this case, the delay signal 9 is partially reflected from the base electrode of the transistor 16 due to the mismatching and thus reflected signal is again passed through the delay circuit 15 where it is further delayed by time $\tau$, for example, 0.25 $\mu$s, that is, delayed by $2\tau$ or 0.5 $\mu$s in total to obtain a delay signal 10 as shown in FIG. 2C at the input side of the delay circuit 15. This signal 10 is joined with the video signal 8 from the input terminal 1 to form a sum signal 11 as shown in FIG. 2D, which is supplied to the base electrode of the transistor 17. As a result, the transistor 16 provides at its collector electrode a signal, as shown in FIG. 5A, which is obtained by subtracting the sum signal 11 from the output signal 9 of the delay circuit 15 because of the differential amplifier construction. While, the transistor 17 provides at its collector electrode a signal, as shown in FIG. 5B, which is obtained similarly by subtracting the output signal 9 of the delay circuit 15 from the sum signal 11. This signal shown in FIG. 5B is opposite in phase to the signal shown in FIG. 5A.

Figure 5C:
Figure 5D:

Referring to the first differential amplifier, when no signal is supplied to this amplifier, the transistor 22 is nonconductive and hence the collector voltage of the transistor 22 is the same as the power supply voltage. Under the above condition, the transistor 22 is assumed to be applied at its base electrode with a signal including base noise as shown in FIG. 5B from the collector electrode of the transistor 17. When the voltage of this signal exceeds the voltage level determined by the variable voltage source 30, the transistor 22 becomes conductive. Once the transistor 22 being made conductive, the collector voltage of the transistor 22 becomes lower than the power supply voltage by a voltage drop across the resistor 24 so that a negative signal free from the base noise as shown in FIG. 5C is derived from the collector electrode of the transistor 22. Similarly, referring to the second differential amplifier, when no signal is supplied to this amplifier, the transistor 26 is nonconductive while the transistor 27 is conductive, so that the collector voltage of the transistor 27 is lower than the power supply voltage by a voltage drop across the resistor 28. In this case, if the signal including base noise as shown in FIG. 5A is supplied from the collector electrode of the transistor 16 to the base electrode of the transistor 26 and the voltage of this signal exceeds the voltage level determined by the variable voltage source 30, the transistor 26 becomes conductive while the transistor 27 becomes nonconductive. Accordingly, the collector voltage of the transistor 27 becomes the same as the power supply voltage so that a positive signal free from base noise as shown in FIG. 5D is obtained from the collector electrode of the transistor 27.

Figure 5E:

Thus, the output signals (shown in FIGS. 5C and 5D) derived from the first and second differential amplifiers are supplied to the base electrode of the transistor 33 to be added together with the result that an aperture correction signal including no base noise as shown in FIG. 5E is obtained at its emitter electrode or at the output terminal 35.

According to the invention as mentioned above, a good aperture correction signal free from base noise can be produced, and it is of course that the aperture correction using the above aperture correction signal permits to reproduce more distinct picture on the screen of the picture tube. Further, according to this invention, the circuit between input and output terminals includes no components such as capacitor or transformer so that it is easy to make direct coupling. This circuit also includes a small number of components so that it is easy to be built as an integrated circuit. In addition, the formation of the integrated circuit results in reducing the stray capacitance of the whole circuit so that it is possible to achieve the quick operation of the circuit as a whole.

In the above example, the description is given on a case where the invention is applied to the circuit for processing the horizontal aperture correction signal, but it is needless to say that the invention is also applicable to a circuit for processing the vertical aperture correction signal.

It will be apparent that many modifications and variations may be effected without departing from the scope of the novel concepts of this invention.

I claim as my invention

1. An aperture correction signal processing circuit comprising:
    first and second differential amplifier stages, each consisting of first and second amplifying devices and each amplifying device having input, output and common electrodes;
    means for providing a first aperture correction signal and a second aperture correction signal, said second aperture correction signal being polarity-inverted signal of said first aperture correction signal;
    means for supplying said first and second aperture correction signals respectively to the input electrodes of the first amplifying devices of said first and second differential amplifier stages;
    means for electrically connecting the input electrodes of the second amplifying devices of said first and second differential amplifier stages;
    means for applying a bias voltage to the input electrodes of said second amplifying devices of the first and second differential amplifier stages;
    means for changing said bias voltage;
    first output means coupled to the output electrode of the first amplifying device of one of said first and second differential amplifier stages;
    second output means coupled to the output electrode of the second amplifying device of the other of said first and second differential amplifier stages; and
    means for adding output signals from said first and second output means.

2. An aperture correction signal processing circuit as set forth in claim 1, in which the common electrodes of the first and second amplifying devices of said first differential amplifier stage are connected with a first constant current source, and the common electrodes of the first and second amplifying devices of said second differential amplifier stage are connected with a second constant current source.

3. An aperture correction signal processing circuit as set forth in claim 2, in which said first and second constant sources are controllable in current and provided with means for simultaneously changing currents flowing through both of said first and second constant current sources.

4. An aperture correction signal processing circuit as set forth in claim 1, in which said means for providing first and second aperture correction signals include a third differential amplifier stage consisting of first and second amplifying devices, each device having input, output and common electrodes.

5. An aperture correction signal processing circuit as set forth in claim 4, in which the common electrodes of said first and second amplifying devices of said third differential amplifier stage are connected with a constant current source.

6. An aperture correction signal processing circuit as set forth in claim 4, in which said means for providing first and second aperture correction signals include means for supplying a video signal to the input electrode of said first amplifying device of the third differential amplifier stage, and means for supplying a delay signal of said video signal to the input electrode of said second amplifying device of the third differential amplifier stage.

7. An aperture correction signal processing circuit as set forth in claim 1, in which said output signal adding means is an amplifying device having input, output and common electrodes.

8. An aperture correction signal processing circuit as set forth in claim 7, in which the input electrode of said amplifying device of said output signal adding means is connected with said first and second output means and the common electrode of the amplifying device of said output signal adding means is connected to an output terminal of the circuit.

* * * * *